United States Patent
Ugolini et al.

(10) Patent No.: US 12,423,477 B2
(45) Date of Patent: Sep. 23, 2025

(54) METHOD FOR CERTIFYING THE AUTHENTICITY OF DIGITAL FILES GENERATED BY A COMMUNICATION DEVICE

(71) Applicant: BEATCODE S.R.L., San Lazzaro di Savena Bologna (IT)

(72) Inventors: Fabio Ugolini, Lugo (IT); Giuseppe Travasoni, San Lazzaro di Savena (IT)

(73) Assignee: BEATCODE S.R.L., San Lazzaro di Savena Bologna (IT)

( * ) Notice: Subject to any disclaimer, the term of this patent is extended or adjusted under 35 U.S.C. 154(b) by 343 days.

(21) Appl. No.: 18/251,218

(22) PCT Filed: Dec. 30, 2020

(86) PCT No.: PCT/EP2020/088036
§ 371 (c)(1),
(2) Date: Apr. 28, 2023

(87) PCT Pub. No.: WO2022/089770
PCT Pub. Date: May 5, 2022

(65) Prior Publication Data
US 2023/0409754 A1    Dec. 21, 2023

(30) Foreign Application Priority Data

Oct. 29, 2020    (IT) .................. 102020000025771

(51) Int. Cl.
*G06F 21/64*    (2013.01)
*G06F 21/60*    (2013.01)
(Continued)

(52) U.S. Cl.
CPC .............. *G06F 21/64* (2013.01); *G06F 21/60* (2013.01); *H04L 9/0637* (2013.01);
(Continued)

(58) Field of Classification Search
None
See application file for complete search history.

(56) References Cited

U.S. PATENT DOCUMENTS

| | | | | |
|---|---|---|---|---|
| 6,135,354 A | * | 10/2000 | Kubon | G06K 7/1478 235/462.11 |
| 7,716,245 B2 | * | 5/2010 | Omae | G06Q 20/1235 707/787 |
| 2014/0201843 A1 | * | 7/2014 | Hibbert | H04L 63/1433 726/25 |
| 2019/0354694 A1 | * | 11/2019 | Azoulay | H04L 9/0637 |
| 2019/0394052 A1 | | 12/2019 | Li et al. | |

(Continued)

FOREIGN PATENT DOCUMENTS

| | | | | |
|---|---|---|---|---|
| CN | 111940321 A | * | 11/2020 | ........... B07C 5/3412 |
| JP | 2005143094 A | * | 6/2005 | ........... H04L 9/3247 |

(Continued)

OTHER PUBLICATIONS

International Search Report and Written Opinion of the ISA for PCT/EP2020/088036 mailed Jul. 5, 2021, 13 pages.

*Primary Examiner* — Ali H. Cheema
(74) *Attorney, Agent, or Firm* — NIXON & VANDERHYE

(57) ABSTRACT

A method for certifying authenticity of digital files generated by an electronic device or by a device directly paired or synchronized with it is described herein. In an implementation, the method comprising steps of receiving a digital file as an input; determining type of said digital file and checking that said digital file belongs to one of certifiable categories; after having determined the type of said digital file, a series of verification steps are carried out comprising: verifying that said digital file has been generated by the electronic device or by the device directly paired or synchronized with it; verifying that operating system of the electronic device has not been tampered with; and verifying that said digital file has not been modified; and allowing a user to proceed (Continued)

with certifying the authenticity of said digital file only if all of the series of verification steps have been successful.

18 Claims, 4 Drawing Sheets

(51) Int. Cl.
*H04L 9/06* (2006.01)
*H04L 9/32* (2006.01)

(52) U.S. Cl.
CPC .......... *H04L 9/3242* (2013.01); *H04L 9/3247* (2013.01); *H04L 9/3263* (2013.01); *H04L 9/3268* (2013.01)

(56) References Cited

U.S. PATENT DOCUMENTS

2020/0336907 A1 10/2020 Jain
2022/0092184 A1* 3/2022 Trim ..................... G06F 21/565

FOREIGN PATENT DOCUMENTS

| JP | 2016513324 A | * | 5/2016 | |
|----|--------------|---|--------|---|
| JP | 2017521744 A | * | 8/2017 | |
| KR | 20040027696 A | * | 4/2004 | |
| KR | 20070099865 A | * | 10/2007 | |
| WO | WO-2008013576 A1 | * | 1/2008 | ............. G06F 21/10 |
| WO | WO-2020130864 A1 | * | 6/2020 | ......... G06F 16/2379 |

* cited by examiner

METHOD FOR CERTIFYING THE AUTHENTICITY OF DIGITAL FILES GENERATED BY A COMMUNICATION DEVICE

CROSS-REFERENCE TO RELATED APPLICATIONS

This application is the U.S. national phase of International Application No. PCT/EP2020/088036 filed Dec. 30, 2020, which designated the U.S. and claims priority to IT 102020000025771 filed Oct. 29, 2020, the entire contents of each of which are hereby incorporated by reference.

The present invention belongs to the field of processing digital files, such as images and videos. More particularly, the present invention relates to a method for certifying that photos or videos generated by an electronic communication device, as well as screenshots and screen recordings, have not been modified in any way.

BACKGROUND OF THE INVENTION

For some time now, particularly as a result of the large-scale spread of mobile communication devices that have one or more integrated cameras, in particular smartphones and tablets, an exponential increase has been witnessed in the production of digital files in the form of images and videos, with figures that annually are in the order of billions of billions of files generated. These digital files can be put into circulation, for example shared with other devices or circulated over the internet, in particular via social networks, or can remain stored in the photo and video library of the device.

With the growth in the number of files produced, technologies and means for modifying photos and videos have also become widespread. Although files are generally modified for entertainment purposes, for illustrative purposes, or in any case in most cases aiming at improvement, it can often happen that files are modified with bad intentions, for the purpose of fraud or also for the purpose of discrediting a person or institution.

For example, a photo taken by a driver following an accident can be modified in order to emphasise or diminish the extent of the claim before his or her insurance company. At the same time, the web is littered with fake photos, made with photo retouching programmes and that portray the characters in a way that alienates them from the real context in which they were taken. This is a phenomenon based on the growing diffusion of so-called deepfake techniques, i.e., software and technologies which are based on artificial intelligence algorithms, capable of superimposing several images and clips together. Often the manipulated files have a high level of reliability and there is no way to prove their fake nature except through a precise comparison with the original file, which in most cases is not available.

A similar argument can also be made when the acquisition concerns what is shown on the screen of the device used by the user, i.e., in the case of screenshots or video recordings of the screen. The term screenshot (also screen capture or screen grab) refers in fact to what is displayed at a given moment on the screen of a smartphone, of a tablet or of other video devices. Despite the English terminology, this word is now also used in Italian to identify the instant photo of the screen of a mobile device, which can then in turn be transmitted to other devices, shared on social networks, published on the internet, and so on.

Taking a screenshot or a photo of the screen of a mobile device, or making a video recording thereof, are activities that are permitted by almost all mobile devices and are performed daily by almost everyone, both for personal and professional purposes. As with standard photos or videos, screenshots or screen recordings can also be modified.

Given the enormous spread of acquisition methods, digital files have inevitably also become part of the legal world, above all as regards the use of screenshots as evidence in court. They are in fact particularly useful tools for photographing, for example, private conversations between the parties to be produced in a court case, with numerous fields of application, such as divorce cases, where screenshots of an extramarital relationship can be acquired, or again trials for stalking, harassment and threats, in which screenshots can include offensive and insulting words of which someone has been a victim.

In this context, the possible counterfeiting of the screenshot or the possible modification of digital files by means of computer programs are options that must always be taken into considerations when such files reach people who have to make a decision on the basis of what is displayed. It is therefore often necessary to resort to a detailed analysis of these images, which a human eye is not able to perform.

In recent years, various systems and software have been developed, and are also used in the legal field, that are able to assess whether a digital file, more particularly photos and videos, has undergone any changes since its acquisition. A brief examination of such systems is made by Al-Ameen in his article "*Modern visibility enhancement and tampering detection tools of digital image forensics: a laconic review*", available online at the address: researchgate.net/publication/314079132_Modern_Visibility_Enhancement_and_Tampering_Detection_Tools_of_Digital_Image_Forensics_A-_Laconic_Review>.

The systems currently in circulation allow, thanks to the use of deep analysis techniques, the detecting of changes made to the digital file and certifying that a file has been altered. However, it must be underlined that failure to detect changes is not sufficient to automatically guarantee that the file is "original". These instruments, which in almost all cases are implemented on devices other than the one with which the photo was taken, or the video recorded, are therefore useful to detect whether, where and how a file analysed has been modified but, precisely because they carry out an analysis subsequently, they cannot in any way guarantee authenticity thereof.

To date, the only way to effectively certify and authenticate a digital file remains that of obtaining certification from an authorised body or a natural person, more particularly a notary public.

From what has been disclosed above, the need is still felt for a system capable of certifying the authenticity of a digital file generated by a device. A digital file that has been certified could in fact not require in a legal context further checks by means of specific systems.

SUMMARY OF THE INVENTION

The object of the present invention is therefore to provide a method designed to certify the authenticity of a digital file generated by an electronic communication device such as a smartphone, a tablet, wearable devices or the like.

More particularly, the object of the present invention is to provide a method capable of verifying that digital files such as photos, videos, screenshots or video recordings of the screen have been generated by the same device on which the method is performed and that they have not been modified in any way.

Another object of the present invention is to provide a method for the certification of digital files generated by devices directly paired or synchronised with the device on which the method is performed, such as for example wearable devices, as well as other mobile communication devices such as tablets, smartphones, etc.

Another object of the present invention is to generate a report of the certification activity carried out that can be shared outside of the device.

Another object again is to provide a method for certifying a digital file, in particular a recording, practically in real time, acquiring it immediately before the certification method starts.

These and other objects are achieved by a method for certifying and authenticating a digital file generated by a device in accordance with the invention having the features listed in the appended independent claim 1 and by an application executable by an electronic device according to claim 15.

Advantageous embodiments of the invention are disclosed by the dependent claims.

Substantially, the present invention relates to a method for certifying the authenticity of one or more digital files consisting of photos, video recordings, screenshots or recordings of a screen generated by an electronic communication device such as a smartphone, a tablet, a wearable device or the like, or generated by a device synchronised or directly paired therewith, the method being capable of being performed by a user via said device and comprising, for each digital file, the steps consisting of:
  receiving the digital file as input;
  determining the type of the input file, in particular whether it is a photo or a video or a screenshot or a recording of a screen;
  verifying that the file has been generated by the device on which said method is performed or by a device synchronised or directly paired therewith;
  verifying that the operating system of said device has not been tampered with;
  verifying that the file has not been modified in any way; and
  allowing the user to proceed with the certification of the authenticity of the file only if all previous verification steps have had a positive result.

BRIEF DESCRIPTION OF THE DRAWINGS

Further features of the invention will be made clearer by the detailed description that follows, referring to a purely illustrative, and therefore not limiting, embodiment illustrated in the accompanying drawings, in which.

DETAILED DESCRIPTION OF THE INVENTION

The present invention will be further described in detail with reference to the accompanying drawings in order to clarify the objects, advantages and functioning thereof. Naturally the drawings do not represent all the possible embodiments of the present invention, but only a part of them.

Figure 1:
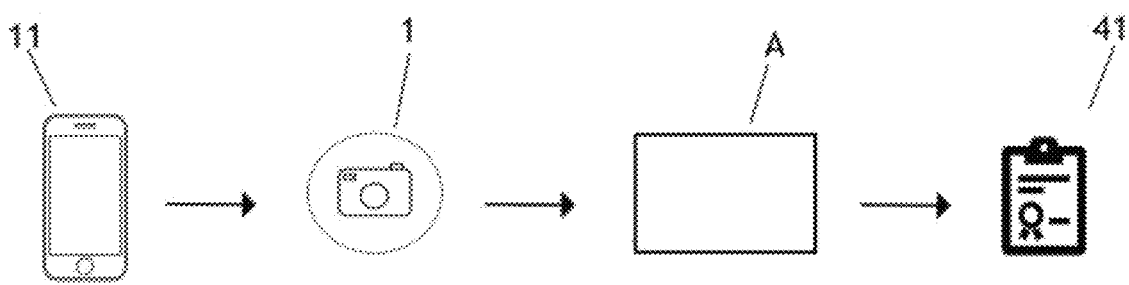
FIG. 1 is a schematic illustration by way of an example of the operating environment in which the method according to the present invention is applied.

Referring to FIG. 1, which is a block illustration purely by way of an example and in no way limiting, the certification method according to the present invention is suitable to be performed by a mobile electronic communication device 11 (hereinafter referred to simply as device), which is the same device by which the digital files 1 to be certified are generated. The method according to the present invention, which can be performed by device 11 for example, but not exclusively, by means of an application A, receives as input a digital file 1 and, by passing a series of checks, makes it possible to establish that it is original, i.e., it comes directly from the same device 11, and authentic, i.e., it has not been modified in any way, with the possibility of obtaining a certificate 41.

According to an important aspect of the present invention, the verification of originality is not limited to digital files 1 generated by device 11 but is also extended to digital files 1 that have been generated by devices 21 directly paired or synchronised with device 11 on which the method is performed. This situation will be illustrated in greater detail here below, with reference also to FIG. 3, it being understood that henceforth, when mention is made of files generated by device 11, reference will also be made to files generated by devices 21 directly paired or synchronised, without departing from the scope of the invention.

The communication device 11 can be a smartphone, a tablet, as well as a wearable device, such as a smartwatch, or a similar device. A digital file 1 to be certified consists instead of a photo or a video generated by the video camera integrated in the device, or, in a preferred aspect of the invention, of a screenshot or a recording of the screen of device 11 or of a device synchronised or directly paired therewith 21.

The operations performed during the execution of the method according to the present invention will now be described in greater detail with particular reference to the flow diagram illustrated in FIG. 2.

A digital file 1 to be certified is received as input or imported in a step S10. File 1 can be imported by the user of the device, for example by selecting it from the photo and video library of the operating system, or it can be acquired directly by an application A which executes the method on device 11. In an immediately successive step S20, it is checked whether the input file 1 belongs to one of the certifiable categories, in particular whether it is a standard photo, a standard video, a screenshot or a screen recording.

After having determined the type thereof in step S20, a series of checks are carried out on the digital file 1 received as input. A step S30 allows it to be determined whether file 1 comes or does not come from the same device (or from a device 21 synchronised or directly paired therewith). In a step S40 a check is made on the status of the operating system of device 11 in order to verify that it has not been tampered with or altered, and in particular whether it is updated to recent versions that have not already been tampered with, while in a step S50 it is verified that the file has not been modified in any way. If all these verification steps have a positive result, in a step S100 it is possible to establish that file 1 is original and authentic and the method can then proceed with certification, otherwise file 1 cannot be certified or included in a certification report (step S0).

Figure 2:
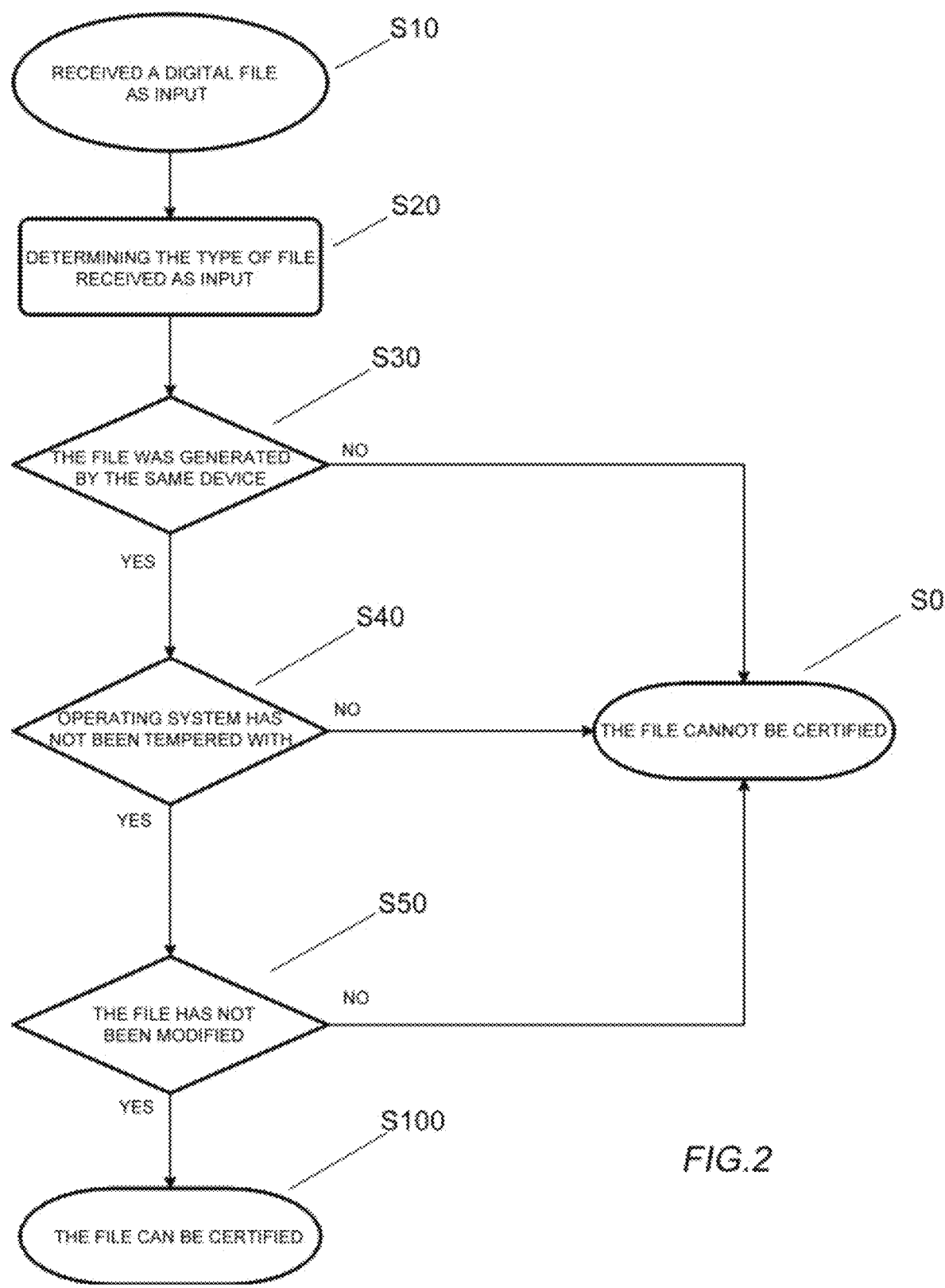
FIG. 2 is a flow diagram showing the operations performed by the method according to the present invention for allowing the certification and authentication of a digital file.

The sequence of verification steps S30, S40 and S50 illustrated in the flow diagram of FIG. 2 should not be understood in a rigid manner, in that the verifications could also be carried out at the same time or in a different time sequence from that illustrated, it being understood that all three verification conditions must be met in order to proceed with certification.

The procedure described above therefore leads to the determination with certainty whether a digital file 1, consisting of a photo or a video or a screenshot or a screen recording, was generated by the same device 11 on which the method is performed and whether it was not modified in any way at the time of importing. In order to better understand the functioning and the objects achieved, the individual steps will be analysed, also by means of example embodiments.

After having received a file as input, the operation carried out in step S20 allows it to be determined whether it falls into one of the categories provided for certification. This operation, like some of those carried out in the successive steps, can be carried out by displaying and interpreting the information "contained" in the digital file. A digital file, in fact, presents both the data that characterise the content reproduced, i.e., in the case of an image the chromatic values of each single pixel, and metadata, i.e., the information associated with the file itself. Through the acquisition of the metadata, it is possible to immediately trace back to information such as the type of digital file (whether it is an audio or video file, etc.), the resolution and the dimensions in the case of photos and videos, any changes made to the file and so on.

In the step S10 of receiving as input or importing of the digital file 1, in addition to the metadata associated with the file itself, data and information on the device in use and on any devices 21 that may be associated or synchronised with it are also acquired. Purely by way of example, the following tables list some of the data and metadata imported for a device 11 and for a digital file 1, respectively. In this non-limiting case, the file is a screenshot imported into an iPhone.

TABLE 1

Data of the device (at the time of acquisition)

IP address
GPS coordinates
Operating system name
Operating system version
Name of the device at the time of acquisition
Carrier name
Carrier country code
Carrier country ISO code (ISO 3166-1)
Carrier mobile network code
SIM connection technology (i.e.: 3G, 4G, etc.)
SSID and BSSID wi-fi in use (if connected to a wi-fi network)
Application version
Device model
Screen size (height and width in pixels)
Date of generation of the acquisition

TABLE 2

Multimedia file data

File fingerprint
Hashing algorithm used
Screenshot dimensions (height and width in pixels)
Apple media type
Apple media subtype
Apple source type
File creation date After having determined in step S20 that the digital file 1 received as input is, for example, a screenshot, the method according to the present invention checks (step S30) whether or not it was generated by the same device 11 on which it is executed by comparing the acquired data and metadata. Optionally, in this step it is also possible to verify that it has the same size as the screen of device 11. However, establishing that file 1 was effectively generated by device 11 (or by a device 21 directly paired or synchronised therewith) is not sufficient to guarantee that it is authentic and therefore not altered.

The purpose of the check carried out in step S50 is precisely to verify that the file has not been modified in any way. Advantageously, this step too can be carried out by going to check the metadata acquired at the time of receiving as input of the file 1. More particularly in the files coming from devices equipped with iOS operating system, this information is present in a specific item of metadata, which expresses in the form of a collection of data (array) all modifications and alterations to the file itself. The verification is therefore aimed at checking that said array is empty.

It should also be noted that this operating system does not allow in any way modifying of the metadata of digital files, unless it is altered or tampered with by a procedure defined in the specific case as jailbreak. The jailbreak is substantially a procedure that allows removing of the software restrictions imposed by the manufacturer, giving the user the possibility to install software and packages of third parties, unauthorised and alternative to those allowed, which could then allow modifying of the metadata of digital files. Procedures similar to the jailbreak are also carried out for other operating systems.

It may therefore occur that a digital file received as input, although it has passed the checks of steps S30 and S50, has in actual fact been modified, and with it its metadata. To this end, in step S40 the status of the operating system is verified, in order to ascertain that it has not been tampered with (or, with a wording initially part of jargon but widely used in the technical field, "cracked").

A preferred method of verification carried out in step S40 consists of checking the version of the operating system currently in use, as well as the last update carried out. It should be underlined that manufacturers clearly do not view favourably the unlocking of their devices and are seeking to counter the spread of this phenomenon. More particularly, each update of the iOS operating system corrects the leaks that allowed the jailbreak in the previous version, causing all the unofficial applications and customisations applied to the system to be lost. Verifying that an operating system is updated to the latest version means, therefore, verifying that it is not tampered with.

In actual fact, a "secure" version of the operating system, i.e., not tampered with, might not necessarily correspond to that of the last available update, but might be extended to versions with less recent updates which, however, are able to correct all the effects of a possible jailbreak (or similar procedures for other systems). In order to verify that the operating system is not tampered with, in step S50 it is therefore verified that the operating system is updated with respect to the latest "crackable" version.

An alternative or complementary verification to the one just disclosed could consist in detecting directly through the analysis of the acquired file the presence on the device of possible unlocking procedures such as the jailbreak.

From what has been disclosed above, it is clear that in order to be able to certify (step S100) that photos or videos or screenshots or recordings of the screen generated by a device have not been modified in any way, it is necessary that all three verifications of steps S30, S40 and S50 are successful. On the contrary, even one unverified condition would not allow the certification of the file (step S0).

The method described above makes it possible therefore to certify the authenticity of files generated by the device 11 on which it is run. However, as already mentioned, it could be necessary to certify files which, although not directly generated by device 11, are in any case authentic in that generated by the same user by means of another connected device.

To overcome this limitation, an important aspect of the present invention allows the certification of digital files generated by one or more devices 21 directly paired or synchronised with the device 11 on which the method is carried out. Such a situation can be represented by the use of an Apple Watch in association with an iPhone, and at global level by all wearable devices (such as smartwatches in general, but not only) univocally paired, and therefore synchronised, with communication devices.

Even more generally, two or more communication devices can be paired one with the other in such a way as to have the files always synchronised and shared on all devices. For example, Apple allows the synchronising of an iPad with iPhone via its iCloud sharing services. In principle, it is almost always possible to synchronise two or more devices marketed by the same manufacturer that share the same authentication method, in particular the same account.

Figure 3:
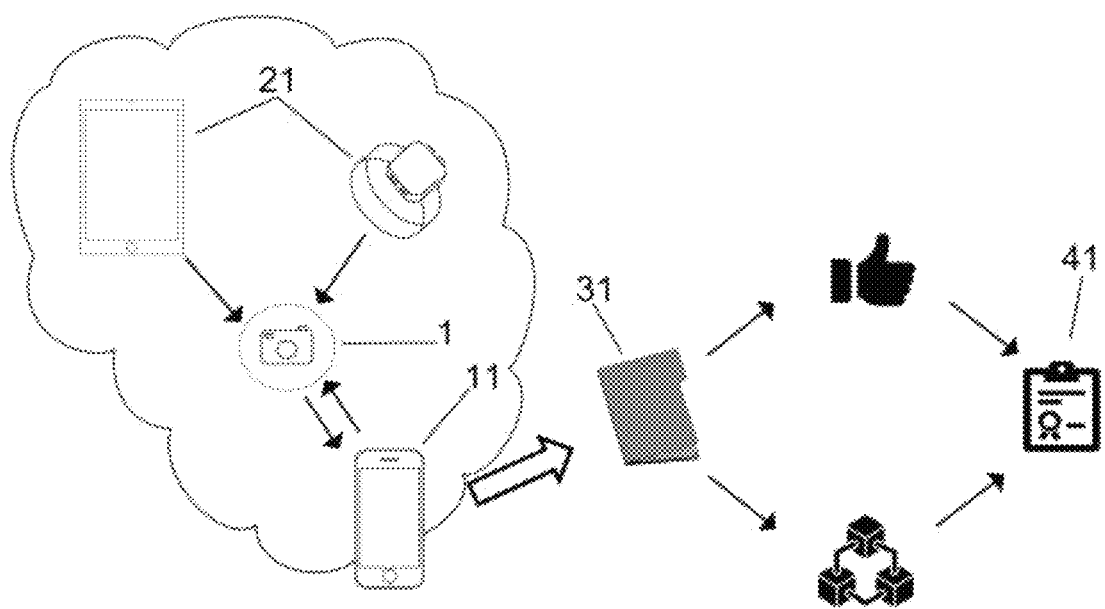
FIG. 3 is a schematic illustration by way of an example of an implemented operating environment in which the method according to the present invention is applied.

In similar situations, a digital file 1 generated by a synchronised device 21, such as for example a screenshot taken by a smartwatch, may be present in the libraries of the main device 11 on which the certification method is performed. Although not generated directly by device 11, such a file is in any case to be considered "authentic", in that it was generated by the same user of device 11 and can therefore be subjected to the certification process. FIG. 3 is a schematic illustration of this situation, to which reference will be made here below to describe also other operations subsequent to step S100.

Clearly the metadata associated with a file acquired by a synchronised device 21 have different values from those generated by device 11, more particularly they may have different dimensions and resolutions, as in the example of acquisition of a screenshot by a smartwatch. For this purpose, the method according to the invention, in addition to what has already been described, foresees the verification in step S30 that the file 1 as input comes from device 11 or from one of the devices 21 synchronised with it.

If, therefore, all the conditions of the steps described above have been verified and it has been established (step S100) that a file 1 received as input is "authentic", i.e., coming directly from the same device, or from a synchronised device, and in no way modified, the method according to the present invention also makes it possible to generate a report 31 and obtain a certificate 41.

Figure 4:
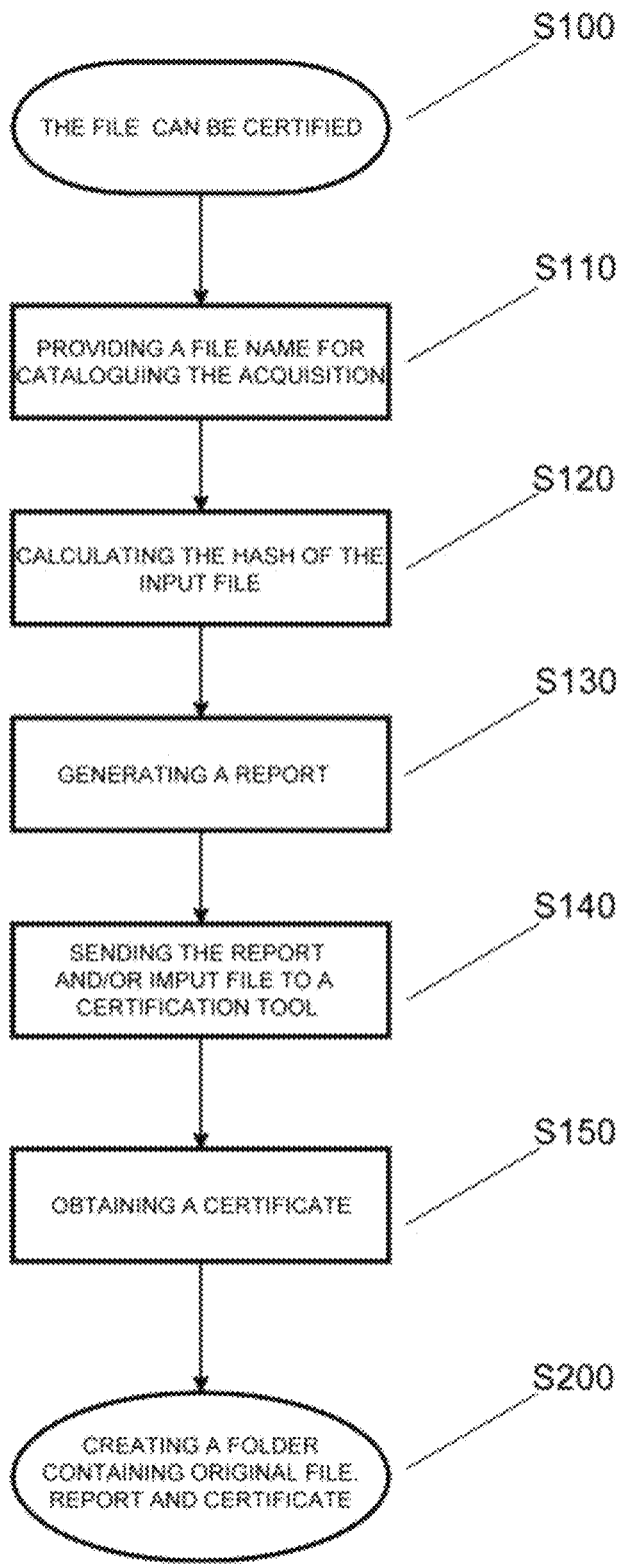
FIG. 4 is a flow diagram showing further operations performed according to preferred embodiments of the present invention.

FIG. 4 shows a sequence of operations performed after step S100. In a step S110 the user of device 11 provides a name with which to catalogue the acquisition just made and in a step S120 the hash of file 1 received as input is calculated. These operations can be carried out for a single file or for several files imported in sequence during the same acquisition, where acquisition must be understood to be an execution of the method on device 11. At this point a report 31 is created (step S130) containing all the metadata obtained from the input files and from the associated hashes, in order to establish a unique association thereof. Inserted in the report 31 is also other technical information, useful for example for explaining the functioning of the technologies used.

A report 31 obtained in this way would already contain all the information sufficient for defining the authenticity of the files received as input and could be used in itself in various applications. However, since it lacks authentication, it would not have the prerequisites in order to be used, for example, in a legal context. In order to provide a certified file that can be used in a legal context, or in general to obtain a certified file to be exhibited in respect of third parties, report 31 and/or digital files 1 are sent to an external system suitable for certifying them digitally (step S140).

The object of step S140 is to obtain a certificate 41 for digital files 1 and/or report 31 whose validity can be demonstrated before third parties. This can be obtained in two preferred ways. A first way consists in sending digital files 1 and/or report 31 to a system capable of applying a digital signature, a time stamp or both. The digital signature represents a certificate of authenticity and integrity of a computer file, while the time stamp is the result of a specific procedure that attributes a precise time reference to the computer file. A file provided with digital signature and time stamp can therefore serve as evidence in respect of third parties.

A second way consists of carrying out the certification through the blockchain. In both cases, the result is the obtaining, in step S150, of a certificate 41 associated with digital files 1 and/or report 31, which guarantees authenticity and immutability thereof. Certificate 41 can generally, but not exclusively, be in the form of an xml file.

After having obtained certification, in a step S200 the files 1 received as input are saved in a folder together with the report 31 generated and the newly obtained certificate 41. The folder thus created is made available to the user of device 11, also for possible sharing. In an optional embodiment, the folder containing all the files, report and certificates is saved in the cloud to ensure continued existence and sharing even if the files cannot be accessed via the device used. In addition, the folder can be compressed and password protected.

The method described above is able to certify digital files coming from a device 11 by selecting them from the photo and video library of the operating system of the device, or from shared libraries, for example via iCloud. In this way it is possible to certify generated files also after a reasonable length of time.

In other embodiments, the present invention allows the certification of digital files practically in real time, i.e., files generated immediately before the step S10 of receiving as input. These embodiments apply substantially to video and video recordings of the screen of the device and make it possible to provide in the verification step S50, in addition or as a partial replacement for the metadata verification, a further guarantee of the fact that the file has not been modified, in particular for those systems where it might be simpler to modify the metadata associated with the files to be certified.

In these embodiments, the method according to the present invention makes it possible, just before the reception as input, to apply to newly generated digital files one or more unique temporary codes (for example a numeric or alphanumeric sequence, an image, etc.) which are valid exclusively for a single session of acquisition and which generally have a limited duration. For this reason, the application of one or more unique temporary codes is particularly useful for establishing the authenticity of a file.

Here below are two examples of embodiments in which a file can be certified immediately after it has been generated.

Example 1—Certification of a Registration with "External" Acquisition

According to this embodiment, just before the step S10 consisting of receiving as input the digital file to be certified, an acquisition step is carried out in which the user is invited to start the recording (normal video or screen capture) by starting up the normal system tools (camera of the device or similar).

Before finishing the recording, the user will communicate the intention of wanting to acquire the file and at the same time a temporary univocal code that characterises the acquisition session will be displayed, shown both in a format readable by the software, such as for example QRcode, barcode and the like, and in a text format, therefore readable. The univocal temporary code in a format readable by software and/or in text format is also inserted in the recording that is being acquired.

From this moment on, the user has available a limited time window (for example thirty seconds or one minute) to end the acquisition step and import the recording. After having displayed the codes and information, the user can then finish the recording through the system tools, which is saved in the video library of the device. At this point the digital file 1 is ready to be imported and received as input (step S10).

After having received as input the newly generated file, all the determination and verification steps already described (S20, S30, S40, S50) are performed. In this embodiment, verification step S50, consisting of determining that the file has not been modified in any way, can comprise or be based exclusively on the analysis of the imported recording. The imported recording is analysed in search of, for example, the QRcode inserted during acquisition, to prove the fact that the temporary univocal code characterising the acquisition session is effectively included in the newly acquired file certifying in fact the authenticity and truthfulness.

Once the presence of the code has been verified, it is possible to proceed with the certification of the file in step S100 and continue with the operations already described. In this application, the associated unique temporary codes can be included in report 31 generated in step S130 and then certified.

Example 2—Certification of a Registration with "Internal" Acquisition

In this embodiment, before step S10 consisting of receiving as input the digital file to be certified, an acquisition step is carried out in which the user is invited to make a recording (normal video or screen capture), which is started autonomously without the user having to activate the normal system tools personally.

The user then starts up the recording and takes a shot or navigates the contents of the device he or she wants to certify. To interrupt the recording, the user will communicate the intention of wanting to acquire the file and at the same time a temporary univocal code that characterises the acquisition session will be displayed, shown both in a format readable by software, such as QRcode, barcode and the like, and in a text format, therefore readable. The temporary univocal code in a format readable by software is also inserted in the recording that is being acquired.

At the end of the acquisition step, the digital file is ready to be imported and is automatically received as input (step S10). At this point all the steps of determination and verification already described (S20, S30, S40, S50) are performed. In this embodiment, the verification step S50, consisting of determining that the file has not been modified in any way, can comprise or be based exclusively on the analysis of the imported recording. The imported recording is analysed in search of, for example, the QRcode inserted during acquisition, to prove that the temporary univocal code characterising the acquisition session is effectively included in the newly acquired file certifying in fact authenticity and truthfulness.

Once the presence of the code has been verified, it is possible to proceed with the certification of the file in step S100 and continue with the operations already described. Also in this application, the associated unique temporary codes can be included in report 31 generated in step S130 and then certified.

From what has been disclosed above, the advantages of the method according to the invention appear clear, which makes it possible to establish with certainty that a content generated by a communication device has not been modified in any way and to obtain a certification that also has legal value, if provided by current legislation.

Naturally the invention is not limited to the particular embodiments previously described and illustrated in the accompanying drawings, but numerous detailed modifications may be made thereto by the person skilled in the art, without thereby departing from the scope of the invention itself, defined by the appended claims.

The invention claimed is:
1. Method for certifying authenticity of one or more digital files consisting of photos, video recordings, screenshots or screen recordings generated by an electronic communication device or generated by a device synchronised or directly coupled with said electronic communication device, the method being executed by a user via said electronic communication device and comprising, for each digital file, steps of:
receiving a digital file as an input,
wherein:
before receiving said digital file as the input, an acquisition session is started consisting of generating said digital file and applying to said digital file a unique temporary code identifying the acquisition session in a format readable by a software and in a text format, and saving said digital file on which said unique temporary code is applied in a photo and video library of operating system of said electronic communication device; and
before ending the acquisition session, the receiving of said digital file as the input consists of importing said digital file from the photo and video library of the operating system of said electronic communication device, the importing of said digital file is available only for a limited time window during which the user can import the said digital file;
determining, in response to the receiving of said digital file, type of said digital file and checking that said digital file belongs to one of certifiable categories;
after having determined the type of said digital file in previous step, a series of verification steps are carried out, comprising:
  verifying that said digital file has been generated by the electronic communication device on which said method is executed or by the device synchronised or directly coupled with said electronic communication device;
  verifying that the operating system of said electronic communication device, on which said method is executed, has not been tampered with;
  verifying that said digital file, at time of receiving as the input, has not been modified in any way;
  allowing to the user to proceed with certification of the authenticity of said digital file only if all of the series of previous-verification steps have been successful.

2. The method according to claim 1, wherein
in the step of receiving the digital file as the input, acquiring a series of metadata associated with both said digital file and said electronic communication device as an input, and
said determining and said verifying steps are carried out based on the check of the series of metadata acquired.

3. The method according to claim 2, wherein the step of verifying that said digital file has not been modified in any way is based on verification of the series of metadata acquired in the step of receiving as the input.

4. The method of claim 3, wherein the step of verifying that said digital file has not been modified in any way comprises; checking a specific item of said series of metadata that indicates whether the digital file has been modified.

5. The method according to claim 3, wherein, after having allowed the user to proceed with the certification of said digital file of the one or more digital files, the following steps are performed:
  providing, by the user of the electronic communication device, a file name for cataloguing acquisition of the one or more digital files inputted;
  calculating hashes for each of the one or more digital files;
  generating a report in which the series of metadata relating to the one or more digital files, the hashes calculated for each of the one or more digital files and further technical information relating to functioning of technologies used are entered.

6. The method according to claim 2, wherein, after having allowed the user to proceed with the certification of said digital file of the one or more digital files, the following steps are performed:
  providing, by the user of the electronic communication device, a file name for cataloguing acquisition of the one or more digital files inputted;
  calculating hashes for each of the one or more digital files;
  generating a report in which the series of metadata relating to the one or more digital files, the hashes calculated for each of the one or more digital files and further technical information relating to functioning of technologies used are entered.

7. The method according to claim 1, wherein, after having allowed the user to proceed with the certification of the authenticity of said digital file of the one or more digital files, the following steps are performed:
  providing, by the user of the electronic communication device, a file name for cataloguing acquisition of the one or more digital files inputted;
  calculating hashes for each of the one or more digital files inputted;
  generating a report in which all metadata relating to the inputted one or more digital files, the hashes calculated for each of the one or more digital files and further technical information relating to functioning of technologies used are entered.

8. The method according to claim 7, also comprising:
  sending the one or more digital files received as input and/or the generated report to a digital certification tool in order to guarantee immutability of the one or more digital files received as input and/or the generated report; and
  obtaining a file containing a digital certificate.

9. The method according to claim 8, wherein the one or more digital files received as the input and/or the report are sent to a system capable of applying a digital signature and/or time stamp.

10. The method according to claim 8, wherein the one or more digital files received as the input and/or the report are sent to a system to carry out the certification through blockchain.

11. The method according to claim 8, further comprising:
  saving said one or more digital files received as the input, the generated report, and the digital certificate in a digital folder, said digital folder being made available for sharing by the user of the electronic communication device.

12. The method according to claim 11, wherein said digital folder comprising the one or more digital files received as the input, the generated report, and the digital certificate is saved to the cloud.

13. The method according to claim 11, wherein said digital folder comprising the one or more digital files received as the input, the generated report, and the digital certificate is compressed and protected by password.

14. The method according to claim 1, wherein:
  after having received the digital file as input, the step consisting of verifying that the file has not been modified in any way comprises an analysis of the digital file acquired in search of the unique temporary code in the format readable by the software applied during the acquisition session; and
  the step consisting of verifying that the digital file has not been modified in any way is successful only if the digital file includes the unique temporary code in a format readable by the software applied during the acquisition session.

15. The method according to claim 1, wherein said step consisting of verifying that the operating system of the electronic communication device has not been tampered with provides check of version and last update made on the operating system and a comparison with last version that can be tampered with.

16. The method of claim 1, wherein the determining step further comprises: checking whether the digital file is a photo, video, screenshot, or screen recording.

17. The method of claim 1, wherein the format readable by the software is one of QRcode and barcodes.

18. A non-transitory computer readable medium on which is stored a computer program comprising instructions that, when executed by an electronic communication device associated with a user, causes the electronic communication device, implemented by one or more processors, to certify authenticity of one or more digital files consisting of photos, video recordings, screenshots or screen recordings generated by the electronic communication device or generated by a device synchronised or directly coupled with the electronic communication device and perform process comprising:

receiving a digital file as an input,
wherein:
before receiving said digital file as the input, an acquisition session is started consisting of generating said digital file and applying to said digital file a unique temporary code identifying the acquisition session in a format readable by a software and in a text format, and saving said digital file on which said unique temporary code is applied in a photo and video library of operating system of said electronic communication device; and before ending the acquisition session, the receiving of said digital file as the input consists of importing said digital file from the photo and video library of the operating system of said electronic communication device, the importing of said digital file is available only for a limited time window during which the user can import the said digital file;

determining, in response to the receiving of said digital file, type of said digital file and checking that said digital file belongs to one of certifiable categories;

after having determined the type of said digital file, a series of verification steps are carried out, comprising:
verifying that said digital file has been generated by the electronic communication device or by the device synchronised or directly coupled with said electronic communication device;
verifying that the operating system of said electronic communication device has not been tampered with; and
verifying that said digital file, at time of receiving as the input, has not been modified in any way; and allowing to the user to proceed with certification of the authenticity of said digital file only if the series of verification steps have been successful.

\* \* \* \* \*